(12) United States Patent
Fedeli et al.

(10) Patent No.: US 8,415,185 B2
(45) Date of Patent: Apr. 9, 2013

(54) PROCESS FOR MAKING A SLOT-TYPE OPTICAL WAVEGUIDE ON SILICON

(75) Inventors: Jean-Marc Fedeli, Saint Egreve (FR); Guang-Hua Duan, Sceaux (FR); Delphine Marris-Morini, Montrouge (FR); Gilles Rasigade, Paris (FR); Laurent Vivien, Vauhallan (FR); Melissa Ziebell, Paris (FR)

(73) Assignees: Commissariat a l'Energie Atomique et aux Energies Alternatives, Paris (FR); Alcatel Lucent, Paris (FR); Centre National de la Recherche Scientifique, Paris (FR); Universite Paris-SUD 11, Orsay (FR)

( * ) Notice: Subject to any disclaimer, the term of this patent is extended or adjusted under 35 U.S.C. 154(b) by 0 days.

(21) Appl. No.: 13/324,721

(22) Filed: Dec. 13, 2011

(65) Prior Publication Data

US 2012/0149178 A1 Jun. 14, 2012

(30) Foreign Application Priority Data

Dec. 13, 2010 (FR) .................... 10 60438

(51) Int. Cl.
*H01L 21/00* (2006.01)
(52) U.S. Cl.
USPC .......... 438/31; 438/22; 438/48; 257/E45.005
(58) Field of Classification Search ............... None
See application file for complete search history.

(56) References Cited

U.S. PATENT DOCUMENTS

| | | | |
|---|---|---|---|
| 6,000,947 A * | 12/1999 | Minne et al. | 438/759 |
| 6,845,198 B2 | 1/2005 | Montgomery et al. | |
| 7,171,095 B2 * | 1/2007 | Sugita et al. | 385/129 |
| 7,601,551 B2 * | 10/2009 | Takeuchi et al. | 438/30 |
| 7,816,702 B2 * | 10/2010 | Saito et al. | 257/98 |
| 7,972,522 B2 * | 7/2011 | Jordana et al. | 216/17 |

(Continued)

FOREIGN PATENT DOCUMENTS

FR 2907916 A1 5/2008

OTHER PUBLICATIONS

B.M.A. Rahman, et al., "Rigorous Characterization of Silicon Nanowire for Compact Nanophotonic Devices", Proceedings of SPIE 2010 Silicon Photonics and Photonic Integrated Circuits II, May 12, 2010, pp. 77191A-1-77191A-10, vol. 7719, XP040523986.
G.T. Reed, et al., "Silicon Optical Modulators", Nature Photonics, Aug. 2010, pp. 518-526, vol. 4.

*Primary Examiner* — Seahvosh Nikmanesh
*Assistant Examiner* — Evren Seven
(74) *Attorney, Agent, or Firm* — Baker Hostetler LLP (57) ABSTRACT

In a process for fabrication of an optical slot waveguide on silicon, a thin single-crystal silicon film is deposited on a substrate covered with an insulating buried layer; a local thermal oxidation is carried out over the entire depth of the thin single-crystal silicon film in order to form an insulating oxidized strip extending along the desired path of the waveguide; an insulating or semi-insulating layer is deposited on the silicon film; two openings having vertical sidewalls are excavated over the entire thickness of this insulating or semi-insulating layer, said openings being separated by a narrow gap constituting an insulating or semi-insulating vertical wall that will be the material of the slot; single-crystal silicon is grown in the openings and right to the edges of the insulating or semi-insulating wall; and then the upper part of the silicon is etched in order to complete the geometry of the waveguide.

8 Claims, 5 Drawing Sheets

U.S. PATENT DOCUMENTS

| | | | |
|---|---|---|---|
| 7,999,344 B2 * | 8/2011 | Assefa et al. | 257/459 |
| 8,252,670 B2 * | 8/2012 | Fedeli | 438/513 |
| 2008/0223821 A1 * | 9/2008 | Jordana et al. | 216/24 |
| 2011/0227116 A1 * | 9/2011 | Saito et al. | 257/98 |
| 2012/0288228 A1 * | 11/2012 | Saito et al. | 385/14 |
| 2012/0302027 A1 * | 11/2012 | Huang et al. | 438/297 |

* cited by examiner

Fig. 19 ial No. FR 1060438, filed on Dec. 13, 2010, the
PROCESS FOR MAKING A SLOT-TYPE OPTICAL WAVEGUIDE ON SILICON

CROSS-REFERENCE TO RELATED APPLICATION

This application claims priority to foreign French patent application No. FR 1060438, filed on Dec. 13, 2010, the disclosure of which is incorporated by reference in its entirety.

FIELD OF THE INVENTION

The invention relates to the fabrication of photonic circuits on silicon. The field of photonic circuits on silicon is that of optoelectronic components capable of handling information in optical form, these components being produced in technologies similar to those used for electronic integrated circuits. These optoelectronic components use the same base material, namely silicon, as the purely electronic components. They are mainly optical modulators, demodulators and non-linear optical circuits and may be combined, on the same substrate, with the electronic circuits that serve for controlling them or that serve for selecting and electronically processing the electrical signals resulting from the conversion of the optical signals in photo detectors. Light sources may also be integrated onto the same substrate. The U.S. Pat. No. 6,845,198 describes an optical modulator on silicon.

BACKGROUND

One of the fundamental concepts consists in forming, in silicon, optical waveguides (lightguides) having very small dimensions (a few hundred nanometres in cross section) subjected to the influence of variable concentrations of carriers (electrons or holes) in the silicon. By electrically modulating the carrier concentration, it is possible to vary the refractive index of the optical medium of the waveguide and therefore the speed of propagation of the light in the waveguide is varied.

For example, by modulating the propagation time of the light in two different optical branches, which are separately controlled, a phase shift is produced between the optical waves leaving the two branches. By making the waves interfere with each other, this phase shift is converted into an amplitude modulation: this is the principle of Mach Zehnder interferometers.

Notably, silicon waveguides called slot waveguides have been devised which comprise two doped silicon walls (of high refractive index), separated by a slot filled with an insulating, or sometimes semi-insulating, medium of low refractive index. The light is confined in the waveguide because of the index discontinuities between the silicon walls and the material of the slot. Confinement is all the better the narrower the slot and the higher the index difference. The two walls may be doped with impurities of the same type and the waveguide behaves electrically as a capacitor. The voltage across the terminals of the capacitor creates electrical charge concentrations in the silicon walls and the concentration variations (whether these be passive or depend upon an electrical control) generate refractive index variations. However, the silicon walls may also be doped with impurities of opposite type, the waveguide then behaving as a pn junction and the voltage variations across the terminals of the junction also create accumulations or depletions of electrical charges acting on the refractive index, and therefore on the light propagation. The insulator (or semi-insulator) placed between the two silicon walls constitute an electrical barrier preventing the transport of charge carriers between the walls. The article "Silicon optical modulators" by G. T. Reed, G. Mashanovich, F. Y. Gardes and D. J. Thomson in Nature Photonics, Vol. 4, August 2010, pages 518-526, describes optical modulators on silicon using slot waveguide structures.

With such slot waveguides, it is possible to produce optical switches, light sources and optical sensors.

It has already been proposed to produce such waveguides by excavating a slot in a silicon layer and filling this slot with insulating or semi-insulating material. However, this process cannot be used to make very narrow slots of sufficient height, since the filling operation cannot take place properly.

It has also been proposed, in patent application of FR 2 907 916, to produce slot waveguides on an SOI (Silicon On Insulator) substrate. The SOI substrate is a silicon substrate covered with an insulating layer (of silicon oxide) which is itself covered with an active silicon layer. In the above publication, a layer of non-stoichiometric silicon oxide $SiO_x$ is firstly deposited, this layer is etched to form two parallel trenches close to each other separated by an insulating or semi-insulating wall, and the silicon trenches are then filled. The silicon may be amorphous or polycrystalline silicon. However, amorphous or polycrystalline silicon is much inferior to single-crystal silicon from the standpoint of the expected effect, which is to obtain rapid and well-defined variations of the free carriers in the silicon. To fill the single-crystal silicon trenches, the SOI substrate must be covered beforehand with a layer of single-crystal silicon before deposition of the $SiO_x$ layer. This single-crystal layer may then serve as a nucleus to grow single-crystal silicon in the open trenches in the $SiO_x$ layer.

However, the process described in that publication has the major drawback of not providing sufficient electrical isolation between the two silicon walls, since they are connected at their base because they both rest on the same single-crystal silicon layer. Even if this layer is very slightly doped and very thin, it is not completely insulating and carriers can move therein, even more so when the slot between the two walls is very narrow.

SUMMARY OF THE INVENTION

The present invention provides an improved process for fabricating a slot waveguide that does not have this drawback and is easy to implement, independently of the desired width of the slot.

The process according to the invention is a process for fabricating an optical slot waveguide on silicon, comprising the deposition of a thin film of single-crystal silicon on a substrate covered with a buried insulating layer, and subsequently the uniform deposition of an insulating or semi-insulating layer on the silicon film, the excavation over the entire thickness of this insulating or semi-insulating layer of two openings having vertical sidewalls separated by a narrow gap constituting an insulating or semi-insulating vertical wall extending along a path which is the desired path for the slot waveguide, and the epitaxial growth of single-crystal silicon in the openings, characterized in that before the uniform deposition of the insulating or semi-insulating layer, a local thermal oxidation is carried out over the entire depth of the thin single-crystal silicon film in order to form an insulating oxidized strip extending along the path of the vertical wall, beneath and either side of said wall over the entire length of the path, so that the insulating vertical wall that will subsequently be formed is not adjacent to the thin single-crystal silicon film.

After the step of oxidizing the thin single-crystal silicon film, the insulating or semi-insulating layer is deposited and etched. Next, the epitaxial growth of silicon is carried out over the entire height of the insulating or semi-insulating vertical wall, including above the insulating oxidized strip and until the silicon comes into contact with the wall over the entire height thereof. During this growth, the silicon covers not only the thin single-crystal silicon film but also the oxidized strip right against the vertical wall. However, although at this point it is not directly in contact with the thin single-crystal film, it does however adopt the single-crystal structure thereof since it is very close to zones growing in a single-crystal manner above the thin film. The silicon may be grown to a height above that of the wall, and in this case a mechanical and/or chemical polishing step is carried out in order to adjust the height of the wall and of the silicon.

Before a single-crystal silicon is grown, a step of reducing the thickness of the insulating or semi-insulating wall may be carried out, this reduction possibly taking place by chemical etching or by dry isotropic etching.

The silicon grown is preferably slightly doped or undoped. It is doped in a step after the deposition. Preferably, the silicon is doped with an n-type impurity on one side of the vertical wall and with a p-type impurity on the other side.

BRIEF DESCRIPTION OF DRAWINGS

Other features and advantages of the invention will become apparent on reading the following detailed description in conjunction with the appended drawings in which.

DETAILED DESCRIPTION

Figure 1:
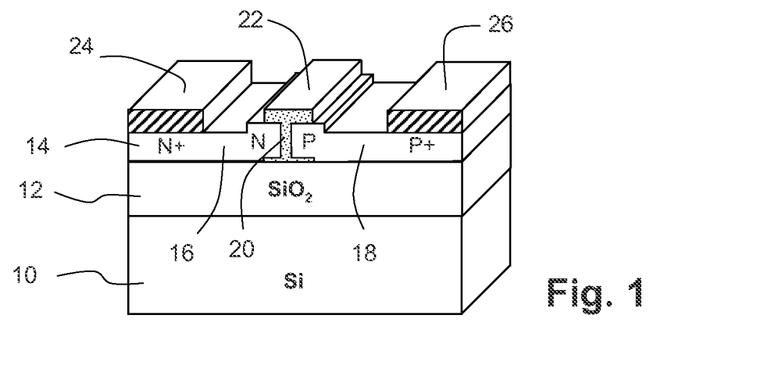
FIG. 1 shows in perspective the basic principle of the slot waveguide structure that it is desired to produce, in order to form a diode-based optical phase shifter.

The structure of FIG. 1 shows the principle of a slot waveguide on silicon, formed on an SOI substrate that can be produced by the process according to the invention. In the case shown, the waveguide comprises an n-p junction with an insulating or semi-insulating slot separating the n region from the p region. However, it would also be possible, while remaining within the scope of the invention, to envisage a junctionless waveguide that would then comprise, on each side of the slot, regions of the same type, n or p, and not regions of opposite type. This waveguide would behave as a pure capacitor, the charge variations on the plates of the capacitor causing optical index variations in the waveguide and therefore optical phase delay variations. The advantage of diode-based waveguides is however the fact that the potential variations applied across the terminals of the junction cause concentration variations by depletion of majority carriers, on both sides of the slot, the depletion process being very rapid. If there are two n regions or two p regions, the action takes place on one side on the majority carriers and on the other side on the minority carriers, thereby slowing down the process of varying the charge concentrations. The rest of the process according to the invention will be described only with regard to a slot waveguide having a p-n junction. However, the invention is also applicable to junctions that include intrinsic silicon in addition to the n-doped and p-doped zones (p-i-n diodes).

The slot waveguide comprises an SOI silicon substrate, composed of a silicon substrate 10 covered with an insulating layer 12 of silicon oxide $SiO_2$, which is itself covered with a silicon layer 14 in which an n-doped region 16 and a p-doped region 18 are formed. A slot 20 filled with insulating or semi-insulating material separates the n region from the p region. The slot is covered with an insulating layer 22. The insulating or semi-insulating material of the slot has an optical index very much lower than that of the doped-silicon walls that flank the slot. To give an example, the material of the slot is based on silicon oxide having an index of 1.5, whereas the doped silicon has an index of 3 to 4. The slot is very narrow (few tens of nanometres in width) and its height is much greater than its width (5 to 10 times higher).

Metal contacts 24 and 26 may be provided on the n and p regions, or on more highly doped regions, namely n+ and p+ doped regions, extending the n and p regions respectively. These contacts serve for controlling the modulation of the carrier concentration in the n and p regions in order to vary the speed of propagation of the light in the slot waveguide.

The fabrication of such a structure starts with a silicon-on-insulator substrate comprising (FIG. 2): a silicon substrate 10 covered with an insulating layer 12 of $SiO_2$, on which a very thin film of single-crystal silicon 30 is grown. The thickness of this film 30 is preferably less than 100 nanometres; a film 30 to 60 nanometres in thickness is preferred. This film is slightly (for example with a concentration of impurities of around $10^{15}$ atoms/cm$^3$) or undoped. It essentially serves as single-crystal growth nucleus for subsequent silicon growth. It must be thin enough to be locally oxidized without any difficulty over its entire thickness.

Figure 2:
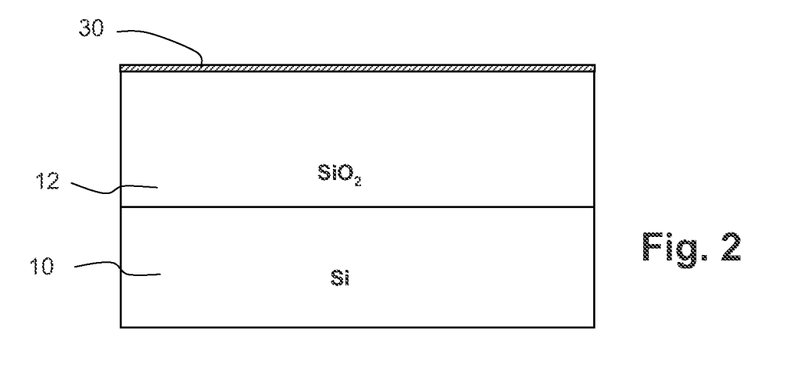
FIGS. 2 to 9 show the successive steps in fabricating the insulating vertical wall that will constitute the slot of the slot waveguide.

Deposited on this silicon film 30 is a masking layer 32, preferably made of silicon nitride $Si_3N_4$. The masking layer 32 is photolithographically etched to define an opening which follows the path, in the length direction, of the slot that it is desired to produce, and is wider than this slot. The expression "length of the slot" is understood to mean the dimension extending along the surface of the substrate. The path of the slot in the length direction may be short or long, straight, broken or curved.

Figure 3:
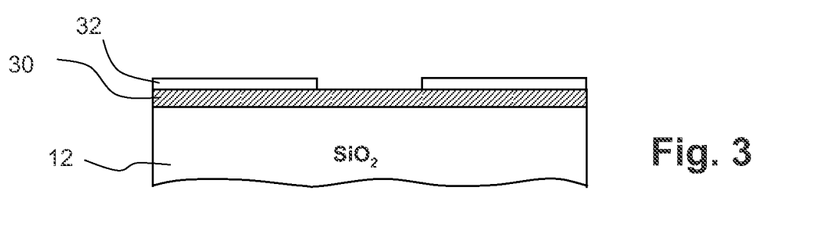

For example, if the slot has to have a width of 30 nanometres, the masking layer is opened over a width of 100 or 200 nanometres. FIG. 3 shows this step, in which it will be noted that the scale is expanded in the height direction relative to the scale in FIG. 2 so as to better reveal the film 30. The roll of the masking layer 32 is to protect the silicon of the film 30 from thermal oxidation.

Figure 4:
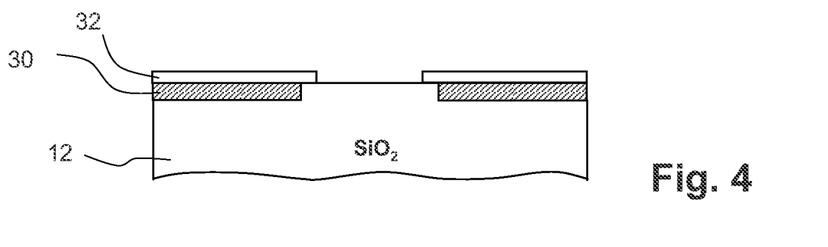

A high-temperature thermal oxidation step is then carried out on silicon 30. The silicon completely oxidizes and becomes the oxide $SiO_2$ at a point where it is not covered by the masking layer 32 (FIG. 4). The silicon film 30 is therefore now separated into two parts by an oxidized strip 40 along the desired path for the slot, so that it will be possible subsequently to apply different potentials to the silicon portions located on either side of the insulating zone thus formed.

Figure 5:
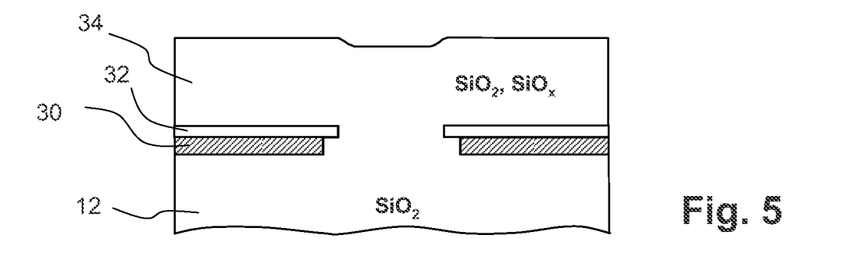

The masking layer is retained and the substrate covered (FIG. 5) with a layer 34 of the insulating or semi-insulating material that will make the material of the slot. This material may be stoichiometric silicon oxide $SiO_2$, or else non-stoichiometric silicon oxide $SiO_x$. If the oxide is non-stoichiometric with x<2, annealing the layer will produce local inclusions of silicon crystals embedded in the insulating oxide $SiO_2$, resulting in a semi-insulating layer. The height of the layer 34 is several hundred nanometres, for example 500 nanometres. It is substantially greater than the desired width for the slot of the waveguide in that the height/width ratio is at least two and preferably between 5 and 10.

In certain cases, the insulating or semi-insulating layer could also be made of III-V material (GaAs or InP) for producing light sources. In such cases, said layer would be bonded rather than deposited in situ.

Figure 6:
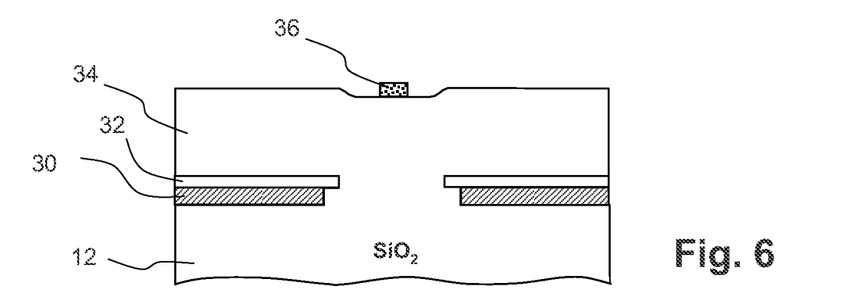

Next (FIG. 6) a new masking layer 36 is deposited and photolithographically etched to define a strip that follows the trace, in the length direction, of the slot to be produced. The width of the strip may be the final width of the desired slot, but if the photolithography does not allow as small a width (typically 30 nanometres) to be produced, a wider layer strip 36 will be formed, for example with a width of 100 nanometres, and the slot width is subsequently reduced, as will be explained later. The mask 36 is preferably made of silicon nitride or silicon carbide or a metal or a resin resistant to the etchants for the $SiO_2$ or $SiO_x$ layer 34.

Figure 7:
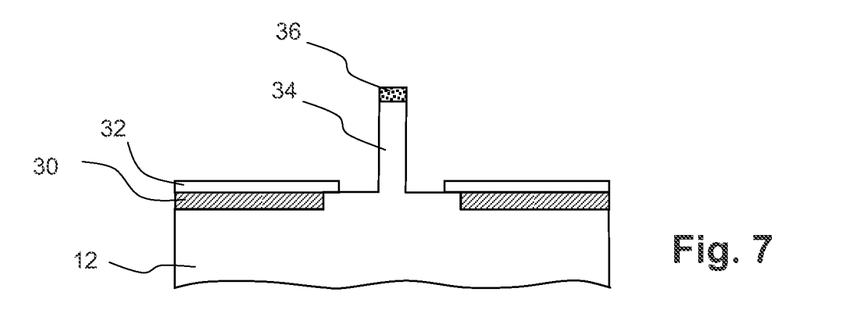

The layer 34 is etched away (FIG. 7) by vertical anisotropic etching, the etching being stopped when the layer 32 lying beneath the layer 34 is reached. The openings formed during this step have vertical sidewalls. Two openings very close together are formed simultaneously, respectively to the left and to the right of the desired path for the slot. A vertical wall 34 located above the strip 40, which was oxidized in the step shown in FIG. 4, remains.

Figure 8:
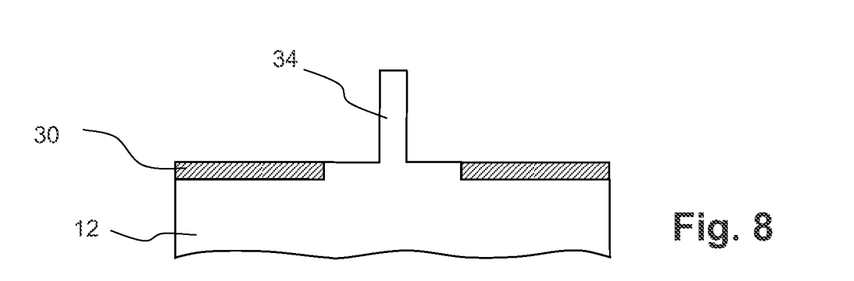

Both the layer 32 and the layer 36 are removed (FIG. 8) chemically or by dry isotropic etching. This removal operation is particularly simple if both these layers are made of silicon nitride and is carried out using an etchant that does not etch the silicon oxide layer 34. There then remains a vertical wall 34 of insulating or semi-insulating material resting on an insulating zone 40 wider than the wall. The wall and the insulating zone 40 follow the desired path for the slot waveguide on the surface of the substrate, over the entire length of this path. Outside the insulating zone 40 is silicon stripped of the original film 30, which silicon is not in contact with the insulating wall 34.

Figure 9:
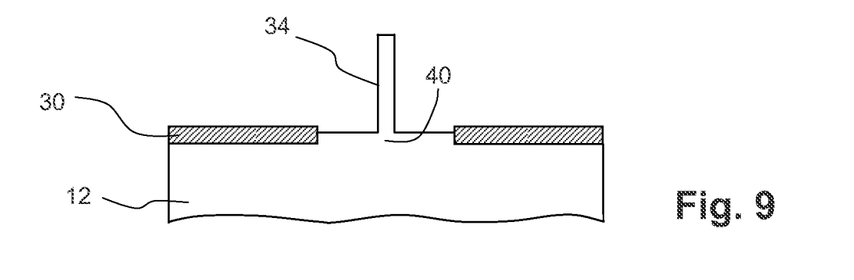

If necessary, the vertical wall of the material serving to form the slot may then be etched anisotropically, thereby further thinning the wall so as to make it pass, for example, from a width of 100 nanometres to a width of 30 to 50 nanometres (FIG. 9). This isotropic etching may reduce the height of the silicon oxide on which the wall rests, but this is not a drawback. Alternatively, if the wall is made of a non-stoichiometric $SiO_x$ compound, the width of the wall may be reduced in two steps, firstly by oxidizing the $SiO_x$ compound over a certain depth (for example 30 nanometres), forming a stoichiometric oxide, and then selectively removing the stoichiometric oxide using an etchant that does not etch the non-stoichiometric oxide or does so only slightly.

Figure 10:
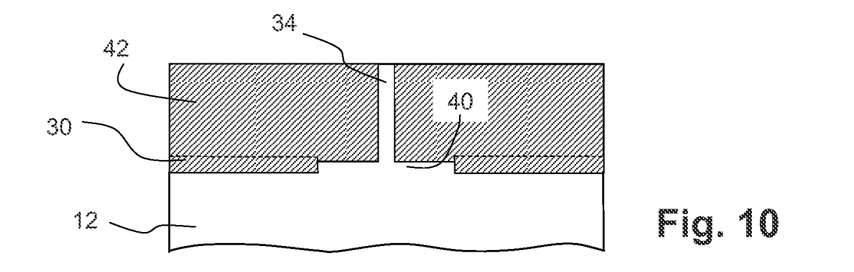
FIGS. 10 to 14 show the steps of growing the silicon that flanks the slot and the doping of the silicon.

A single-crystal epitaxial silicon layer 42 is then grown to a thickness corresponding to at least the height of the insulating or semi-insulating wall 34. The epitaxial growth takes place vertically and laterally. It covers the lateral insulating zones 40 on either side of the wall and may also cover the wall. If the silicon thickness is such that the wall is covered by the silicon, a chemical and/or mechanical polishing (CMP) step may then be carried out to bring the height of the silicon and the height of the wall back down to the same plane surface, at a desired height (FIG. 10).

The silicon that is grown at this stage is slightly doped intrinsic silicon (for example with around $10^{15}$ atoms per cubic centimetre), the p- or n-doping thereof then being supplemented according to requirements.

Figure 11:
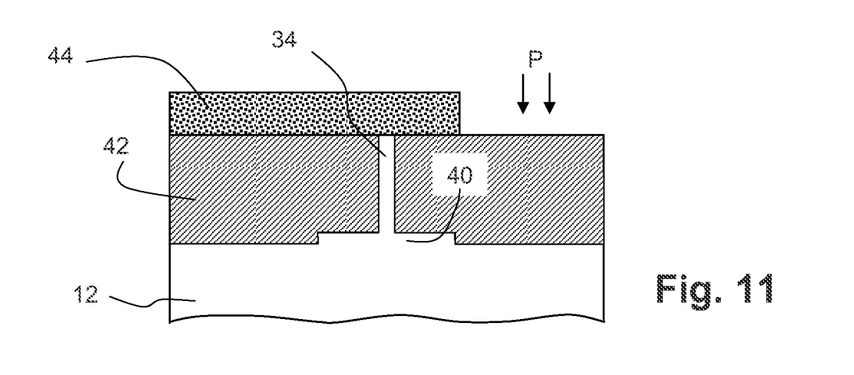

In FIG. 11, the p zone is doped while masking the substrate with a resist mask 44 over the entire left-hand part in the figure, including the insulating or semi-insulating wall 34. The doping is carried out by ion implantation and will be subsequently followed by annealing, to make the implanted impurities diffuse right to the immediate proximity of the insulating wall 34.

Figure 12:
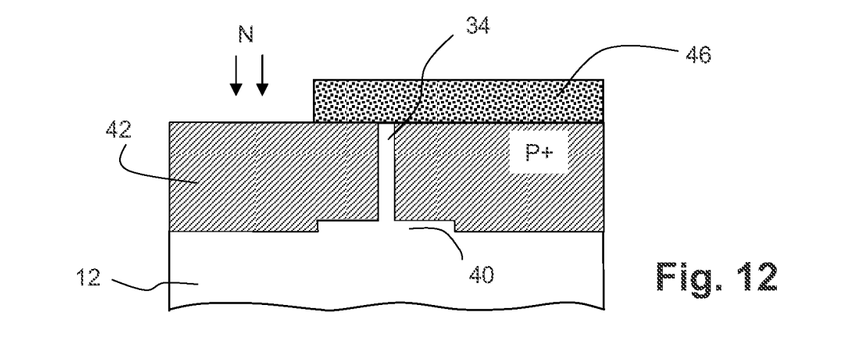

In FIG. 12, an operation similar to that shown in FIG. 11, but reversed to implant an n-type impurity on the other side of the wall 34, is carried out. For this purpose, a resist mask 46 replaces the mask 44 for protecting the right-hand part shown in the figure and for baring the silicon over the left-hand part. Here again, the subsequent annealing will make the implanted impurities diffuse right to the proximity of the wall 34.

Figure 13:
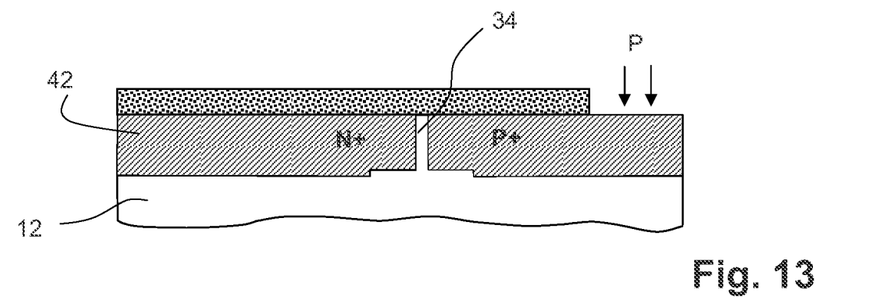
Figure 14:
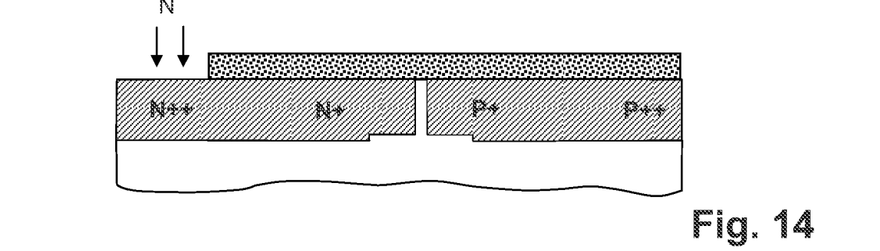

Optionally, these implantation operations may be supplemented with further implantations, on each side, for locally introducing even more p-type impurities on the right (FIG. 13, drawn on a smaller scale than the preceding FIGS. 2 to 12) and n-type impurities on the left (FIG. 14) at places where it is desired to establish electrical contacts with metallic interconnects.

Figure 15:
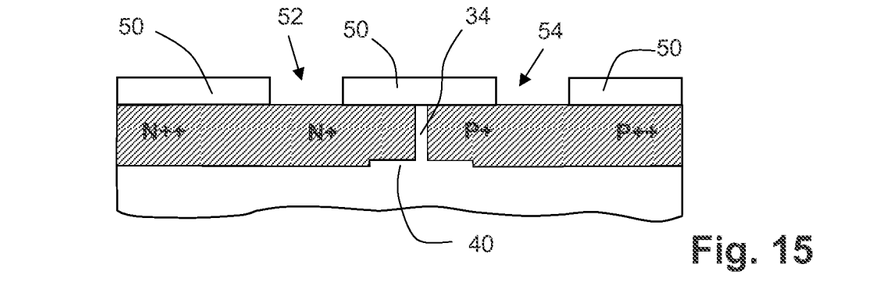
FIGS. 15 and 16 show the top closure of the waveguide and the etching of the constituent silicon thereof.

Next, the entire substrate is covered with an insulating layer 50 which is etched (FIG. 15) in order to remove it on either side of the insulating strip 40 that follows the path of the waveguide. The insulating layer 50 therefore remains above the actual waveguide, that is to say above the slot formed by the insulating or semi-insulating wall 34 and above silicon zones alongside the slot, on either side thereof. However, the layer 50 is removed, and bares the silicon along two lateral strips 52 and 54 on either side of the waveguide.

Next (FIG. 16), silicon in the zones 52 and 54 not protected by the oxide 50 is etched and part of the height of the n-type silicon and of the p-type silicon is removed.

Figure 16:
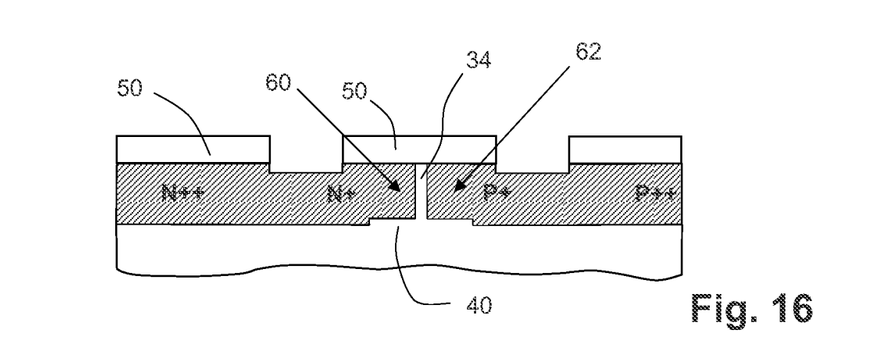

The slot waveguide is then defined by the slot 34 made of insulating or semi-insulating material, the two silicon zones 60 and 62 located on either side of the slot and bounded by the etching of a part of the depth of the silicon, the insulating zone 40 located beneath the slot and beneath these two silicon zones, and the oxide layer 50 above the slot and above the two silicon zones.

The silicon etch depth is for example about one third of the height. It must be sufficient for properly confining the optical waves along the path of the slot waveguide even if this path has bifurcation angles or curvatures, but not too large so as not to induce excessively high optical losses (and so as not to create, in operation, too high an electrical resistance for access to the zones 60 and 62).

The annealing that allows the previously implanted p and n impurities to diffuse (as explained with reference to FIGS. 11 to 14) may be carried out at this stage.

Figure 17:
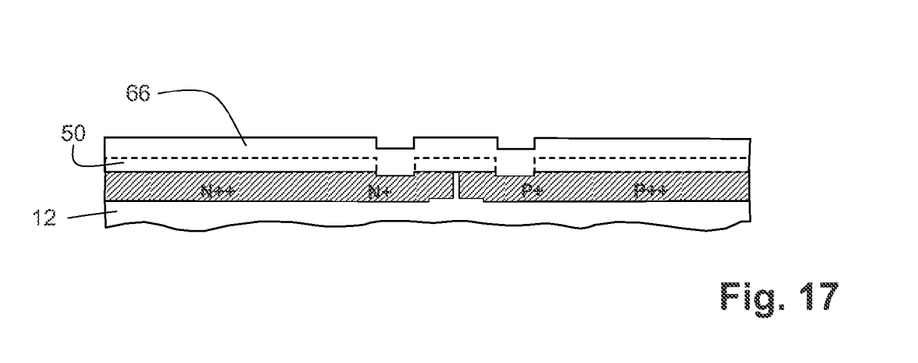
FIGS. 17 to 19 show the formation of electrical contacts for access to the waveguide, for carrier concentration modulation.
Figures 18, 19:
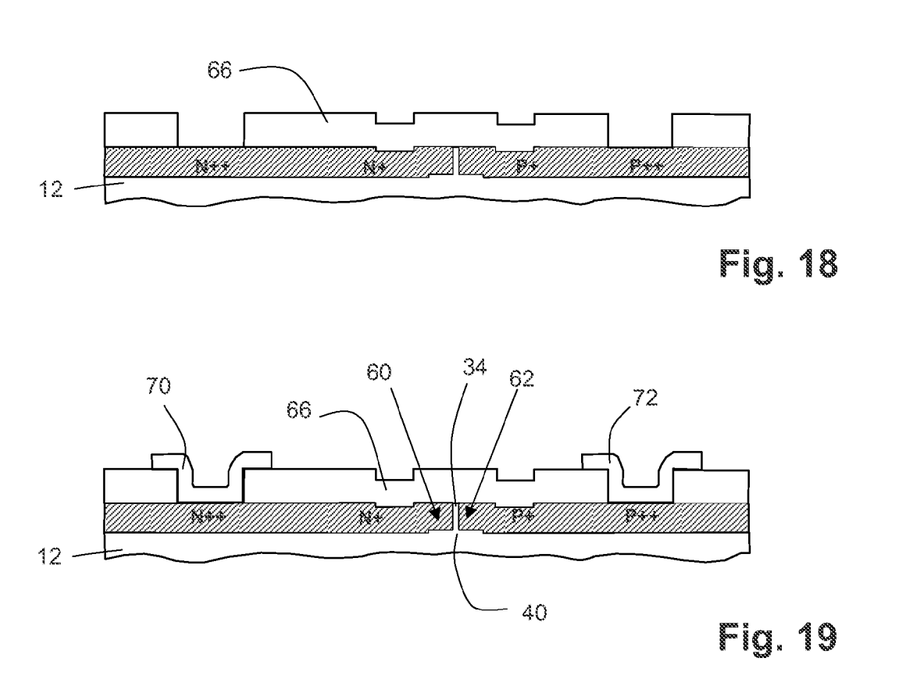

The entire substrate is then covered with a new insulating layer 66 (FIG. 17, drawn on a smaller scale than the previous FIGS. 13 to 16). This layer 66 is opened (FIG. 18) so as to bare the silicon at the place where additional n++ and p++ implantation intended for making contact have been carried out. Finally, a metal (for example aluminium) layer is deposited and etched so as to establish the necessary interconnects and the contacts 70 and 72 for access to both sides of the slot waveguide (FIG. 19).

The invention claimed is:

1. A process for fabricating an optical slot waveguide on silicon, comprising the steps of:
   deposition of a thin film of single-crystal silicon on a substrate covered with a buried insulating layer, and subsequently uniform deposition of an insulating or semi-insulating layer on the silicon film, excavation over the entire thickness of this insulating or semi-insulating layer of two openings having vertical sidewalls separated by a narrow gap constituting an insulating or semi-insulating vertical wall extending along a path which is the desired path for the slot waveguide, and epitaxial growth of single-crystal silicon in the openings wherein, before the uniform deposition of the insulating or semi-insulating layer, a local thermal oxidation is carried out over the entire depth of the thin single-crystal silicon film in order to form an insulating oxidized strip extending along the path of the vertical wall, beneath and either side of said wall over the entire length of the path, so that the insulating vertical wall that will subsequently be formed is not adjacent to the thin single-crystal silicon film.

2. A process according to claim 1, wherein, after the step of oxidizing the thin single-crystal silicon film, the insulating or semi-insulating layer is deposited and etched.

3. A process according to claim 2, wherein the epitaxial growth of silicon is carried out until the silicon comes into contact with the wall, including above the insulating oxidized strip.

4. A process according to claim 1, wherein a mechanical and/or chemical polishing step is carried out in order to adjust the height of the silicon and of the wall.

5. A process according to claim 1, wherein, before a single-crystal silicon is grown, a step of reducing the thickness of the insulating or semi-insulating wall is carried out.

6. A process according to claim 1, wherein, after epitaxial growth of the silicon, the latter is doped.

7. A process according to claim 6, wherein the silicon is doped with an n-type impurity on one side of the wall and with a p-type impurity on the other side.

8. A process according to claim 6, wherein the silicon is doped with the same type of impurity, either n or p, on each side of the wall.

* * * * *